(12) United States Patent
Strzala

(10) Patent No.: US 11,898,612 B2
(45) Date of Patent: Feb. 13, 2024

(54) BRAKE PAD OF A VEHICLE BRAKE, VEHICLE BRAKE AND METHOD FOR ASSEMBLING A VEHICLE BRAKE

(71) Applicant: ZF CV Systems Europe BV, Brussels (BE)

(72) Inventor: Wieslaw Strzala, Byczyna (PL)

(73) Assignee: ZF CV Systems Europe BV, Brussels (BE)

( * ) Notice: Subject to any disclaimer, the term of this patent is extended or adjusted under 35 U.S.C. 154(b) by 111 days.

(21) Appl. No.: 17/488,861

(22) Filed: Sep. 29, 2021

(65) Prior Publication Data
US 2022/0099148 A1   Mar. 31, 2022

(30) Foreign Application Priority Data

Sep. 30, 2020   (EP) .................................... 20199137

(51) Int. Cl.
| | | |
|---|---|---|
| F16D 66/02 | (2006.01) | |
| F16D 55/02 | (2006.01) | |
| F16D 65/092 | (2006.01) | |
| F16D 65/12 | (2006.01) | |
| F16D 55/00 | (2006.01) | |
| F16D 65/02 | (2006.01) | |

(52) U.S. Cl.
CPC ........... F16D 55/02 (2013.01); F16D 65/092 (2013.01); F16D 65/12 (2013.01); F16D 66/026 (2013.01); *F16D 2055/0008* (2013.01); *F16D 2055/0016* (2013.01); *F16D 2055/0075* (2013.01); *F16D 2065/1304* (2013.01); *F16D 2065/134* (2013.01)

(58) Field of Classification Search
CPC ........ F16D 55/02; F16D 65/092; F16D 65/12; F16D 66/026; F16D 2055/0008; F16D 2055/0016; F16D 2055/0075; F16D 2065/1304
USPC .......... 267/159–162, 165; 188/1.11 E, 1.11 L
See application file for complete search history.

(56) References Cited

U.S. PATENT DOCUMENTS

| | | | | |
|---|---|---|---|---|
| 2,725,964 A | * | 12/1955 | Maurer | ................. F16D 13/583 |
| | | | | 192/89.25 |
| 3,652,138 A | * | 3/1972 | Collett | ................. E21B 17/105 |
| | | | | 175/325.7 |
| 4,133,542 A | * | 1/1979 | Janian | ................. F16J 15/3212 |
| | | | | 277/555 |

(Continued)

FOREIGN PATENT DOCUMENTS

| | | |
|---|---|---|
| DE | 202008013226 U1 | 2/2009 |
| DE | 102010048988 A1 | 4/2012 |

(Continued)

*Primary Examiner* — Christopher P Schwartz
(74) *Attorney, Agent, or Firm* — Dickinson Wright PLLC

(57) ABSTRACT

A brake pad of a vehicle brake, in particular of a disc brake of a commercial vehicle, includes a brake pad carrier having a support surface, a friction lining attached to the support surface, a recess extending into the support surface in an axial direction, and a wear indication device arranged at least partially inside the recess. The brake pad carrier includes a clamping member coupled to the wear indication device that rests against an inner wall of the recess. The clamping member is configured to apply a clamping force on the wear indication device in a radial direction. The wear indication device and the clamping member are inserted axially into the recess.

19 Claims, 4 Drawing Sheets

(56) References Cited

U.S. PATENT DOCUMENTS

| | | | | |
|---|---|---|---|---|
| 4,680,847 A * | 7/1987 | Bauer | ............ | F16F 1/32 |
| | | | | 72/402 |
| 8,113,548 B2 * | 2/2012 | Gunderson | ......... | F16L 37/0987 |
| | | | | 285/305 |
| 9,074,647 B2 * | 7/2015 | Stumpf | ............ | F16D 66/024 |
| 9,121,507 B2 * | 9/2015 | Ghalambor | ......... | F16J 15/3452 |
| 2006/0033251 A1 * | 2/2006 | Janian | ............ | F16F 1/025 |
| | | | | 267/158 |

FOREIGN PATENT DOCUMENTS

| | | | |
|---|---|---|---|
| EP | 2182236 A1 | 5/2010 |
| EP | 2532916 A1 | 12/2012 |

\* cited by examiner

BRAKE PAD OF A VEHICLE BRAKE, VEHICLE BRAKE AND METHOD FOR ASSEMBLING A VEHICLE BRAKE

FIELD

The present disclosure relates to a brake pad of a vehicle brake, in particular of a disc brake of a commercial vehicle.

BACKGROUND

Brake pads and their carriers are generally known in the art. It is the aim of such a brake pad carrier to carry the friction lining of the brake pad close to a brake disc. The friction lining is configured to bear against the brake disc during braking, which in turn causes the friction lining to wear over time. To monitor the friction lining thickness, in particular to determine whether the thickness of the friction lining is below a predefined wear limit, it is known in the art to arrange a wear indication device near the friction lining. As the wear, i.e. consumption, of the friction lining caused by the rotor of the brake progresses, at some point the wear indication device will commence to be worn off, i.e. consumed, as well. A live wire is typically routed through the wear indication device in the portion that is subject to wear. Once the wire is ruptured by the rotor of the brake mechanism, a voltage change is registered as a function of the rupture, indicating that the wear limit is reached. Only a residual amount of friction lining remains such that the vehicle can safely be taken to a maintenance station for brake pad replacement.

Because the wear indication device has to be arranged near the friction lining, it is known in the art to couple the wear indication device to the brake pad carrier. Further, a secure and reliable coupling of the wear indication device and the brake pad carrier is required, because any changes in position of the wear indication device relative to the brake pad result in erroneous wear monitoring of the brake pad.

As such, the known coupling means are configured to couple the wear indication device with the brake pad carrier by way of a positive connection in a non-reversible manner.

DE 10 2010 048 988 A1 shows a coupling means that is configured to couple the wear indication device to the brake pad carrier by way of a positive and non-reversible snap-fit. Said coupling means have a number of spring legs extending radially outwards. The spring legs are configured to engage a stop shoulder within a recess provided in the brake pad carrier. Said snap-fit provides an appropriate and reliable coupling of the wear indication device and the brake pad carrier.

However, there is still room for improvement. In particular, the above solution of the state-of-the-art is restricted to applications that do not require a replacement of the wear indication device.

SUMMARY

It is therefore an object of the present disclosure to provide a brake pad that overcomes the above-mentioned issue. In particular, it is an object of the present disclosure to provide a brake pad that allows for the coupling of the wear indication device in a detachable manner.

In accordance with an aspect of the disclosure, a brake pad of a vehicle brake, in particular for a disc brake of a commercial vehicle includes: a brake pad carrier and a friction lining attached to a support surface of the brake pad carrier, a recess extending from the support surface in an axial direction, and a wear indication device arranged at least partially inside the recess.

In accordance with the present invention, a brake pad of the above-mentioned type may include a clamping member, wherein the clamping member rests against an inner wall of the recess, wherein the clamping member is configured to apply a clamping force on the wear indication device in a radial direction.

The term "axial direction" refers to an axis along which the recess is extending within the brake pad carrier. Preferably, the axial direction additionally defines the normal direction of the support surface. In one aspect, the axial direction extends at an angle that is equal, preferably larger than 100 degrees to 260 degrees relative to the support surface.

The term "radial direction" refers to the radial direction relative to the axial direction defined for the recess.

It will be understood that by suggesting a clamping member that is configured to apply a clamping force on the wear indication device in a radial direction, a non-positive connection is provided.

The inventors of the present disclosure discovered that a non-positive connection surprisingly provides an appropriate securing of the indicator in the axial direction. Due to the clamping force, tolerances between the wear indication device and the recess can be compensated for and vibration occurring during operation can be damped.

In the light of the prior art, the proposed design and, in particular, the non-positive connection is counter-intuitive, as the prior art positive connection of the wear indication device and the brake pad carrier has been proven successful and provides outstanding safety against a displacement of the wear indication device in the axial direction. However, the safety margin of the present disclosure was found to be met and, in addition, the use of a clamping member applying a clamping force in a radial direction provides a simplified design of the coupling member. Further, by using a clamping member in order to provide a non-positive connection between the wear indication device and the recess, a simpler and more cost-effective construction of the brake pad is provided. Another further advantage of the clamping coupling between the wear indication device and the recess of the brake pad is that it is now easily possible to uncouple, in other words unmount or disconnect, only the wear indication device from the brake pad, be it for maintenance, repair, or other indications.

In a preferred embodiment, in one aspect, the wear indication device has a shaft portion received in the recess and a head portion resting against the support surface, wherein the shaft portion is configured to couple the wear indication device to the brake pad carrier. Thus, the head portion resting against the support surface allows an intuitive and repeatable positioning of the wear indication device relative to the brake pad. Further, the non-positive connection in general allows a detachable connection of the wear indication device and the brake pad carrier, and at the same times provides an appropriate securement against accidental release during operation, because for releasing the shaft portion a linear movement along the axial direction is required, which does not occur during operation.

Preferably, the shaft portion is at least partially cylindrical and the clamping member extends at least partially circumferentially around the shaft portion. By having a partially cylindrical or cylindrical shaft portion, a more equal force introduction by the clamping member along the lateral surface of the cylindrical part of the shaft portion is provided.

In accordance with a preferred embodiment, in one aspect, the shaft portion has a circumferential groove at least partially receiving the clamping member. Thus, a repeatable positioning of the clamping member relative to the wear indication device and the recess is provided.

Preferably, in one aspect, the groove has a first transverse extension in the axial direction and the clamping member has a second transverse extension in the axial direction, and the first transverse extension is larger than the second transverse extension. The term "transverse extension" as used herein refers to a width of the respective groove or clamping member that extends in the axial direction. The transverse extension extends orthogonal to the circumferential direction and the radial direction. Thus, transverse extension can also be interpreted as axial length.

The groove or the clamping member can be defined by different cross-sectional areas as for example a rectangular, polygonal, or oval cross-sectional area. Thus, for example, the polygonal or oval cross-section does not have a discrete transverse extension but a transverse extension that is a function of the height of the groove in radial direction. Therefore, the term "transverse extension" may also be used to describe the average transverse extension in the respective cross-sectional area when non-parallel opposing sides of the groove cross-section are used.

The present disclosure advantageously recognizes that by the groove having a larger transverse extension when compared to the clamping member, the clamping member can perform evasive, compensating movements in the axial direction when introduced into the recess together with the wear indication device during mounting of the brake pad or the vehicle brake, respectively.

In another aspect, it may be further preferred that the groove has a first cross-sectional area that is defined by a base side and at least two sides extending at an angle that is equal, preferably larger than 90° from the base side, and where the clamping member has a second cross-sectional area that is at least partly received between the first and the second side. Thus, the clamping member may be disposed axially between the two (or more) sides. Thus, a cavity is provided between the base side, the first side and the second side and the clamping member can perform evasive to compensating movements when introduced into the recess together with the wear indication device during mounting of the brake pad. After introduction the clamping member can reversibly extend in radial direction.

In accordance with a further preferred embodiment, in one aspect, the shaft portion has a stop shoulder and the clamping member rests against the stop shoulder. Thus, the stop shoulder assists insertion and retention by positioning the clamping member in a repeatable manner.

In one aspect, it is further preferred that the stop shoulder or the groove is arranged in the distal half of the shaft section, meaning the half that is disposed away from the head of the wear indication device and the end that is inserted into and received in the cavity. Of course, the proximal half may also be received in the cavity, but is received in the cavity after the distal end has been received. Thus, the clamping force is applied on the distal half of the shaft section and consequently in the base half of the recess. Thus, the work or energy required to release the indicator is increased due to the increased distance to overcome.

In a further preferred embodiment, in one aspect, the shaft portion has a length that is at least equal to, preferably exceeding the width or depth or diameter of the shaft portion. Thus, the shaft portion provides an appropriate length with respect to the lateral surface such that a sufficient amount of work has to be done in order to release the wear indication device from its position inside the recess.

In a preferred embodiment, in one aspect, the clamping member comprises an elastomeric material. An elastomer is a polymer that has very weak intramolecular forces, generally a low young's modulus and high elongation at break compared with other materials. Elastomers are amorphous polymers maintained above their glass transition temperature, thereby allowing a considerable molecular reconfirmation, without breaking up covalent bounds. At ambient temperatures, elastomers are thus relatively soft and deformable. The weak intramolecular forces permit the elastomers to stretch in response to microscopic stresses. Elastomers are usually thermosets but may also be thermoplastic as for example thermoplastic elastomers.

Due to the elastomeric material, the clamping member is elastically deformable to such an extent that when it is inserted into the recess with a wear indication device, it deflects laterally, i.e. in the axial direction, due to the shear forces acting on the clamping member. The clamping member can then reversibly re-form in the radial direction in order to apply forces in the radial direction on the wear indication device.

Preferably, in one aspect, the clamping member has an O-ring arranged around the shaft portion of the wear indication device. Such an O-ring provides a simple and cost effective standard component that usually comprises an elastomeric material such that the O-ring can apply forces in the radial direction after being inserted in the recess together with a wear indication device.

In a further preferred embodiment, in one aspect, the clamping member comprises a spring-steel. A clamping member comprising a spring-steel provides a high strength while at the same time being elastically deformable upon the shear stresses occurring during the insertion of the clamping member together with a wear indication device. It will be understood that an appropriate design must be chosen that allows the above-mentioned elastic deformability in the required range, e.g. by using a low wall thickness for the spring steel. Furthermore, a clamping member comprising a spring-steel provides an increased wear resistance when compared to polymer materials.

Preferably, the clamping member has a star washer arranged around the shaft portion of the wear indication device, and/or the clamping member has a slotted ring, preferably a retaining ring or a snap ring or a slotted ring form of an undulated spring band material, arranged around the shaft portion of the wear indication device. The invention advantageously recognizes that a star washer as well as a slotted ring allow, due to their design, an evasion in a radial direction during the insertion of the clamping member together with the wear indication device.

A star washer is usually a meander-shaped punched ring, preferably slightly conical in the axial direction. Such star washers have a star-like shape in a plane extending parallel to the radial direction or a plane defined by the meander-shape. Due to the slightly conical design in the axial direction, during insertion of the clamping member together with the wear indication device, a force in the axial direction can be applied to the clamping member, e.g. when coming into contact with a stop shoulder or an inner wall of the groove, such that the conically shaped disc is pressed into a planar surface thereby applying a force in the radial direction on the wear indication device.

Further designs can be provided, in one aspect, e.g. by slotted rings made of round wire or undulated spring band material. In embodiments in which the clamping member comprises a slotted ring made of round wire, the distal ends of the round wire are at a distance from each other and configured to move towards each other upon forces acting on the wear indication device, e.g. in radial direction or shear forces. In embodiments in which the clamping member comprises a slotted ring made of spring band material with wave-like characteristics, the wave-like characteristics can be understood as many small compression springs distributed around the circumference. These are pre-tensioned when the clamping member is pressed in the recess and thus creating a frictionally engagement but at the same time still a detachable connection of the recess and the wear indication device.

The invention has hereinabove been described in a first aspect will respect to a brake pad.

In a second aspect, the invention also relates to a vehicle brake, in particular to a disc brake of a commercial vehicle, the vehicle brake comprising: a brake disc, a brake pad comprising a friction lining, wherein the friction lining is configured to bear against the brake disc during braking, and the brake pad further comprising a brake pad carrier configured to carry the brake pad proximate the brake disc, the brake pad carrier comprising: a support surface for carrying the brake pad, a recess extending from the support surface in an axial direction, and a wear indication device arranged at least partially inside the recess.

According to the second aspect, the invention achieves the initially mentioned object by providing a brake pad that further has a clamping member resting against an inner wall of the recess, wherein the clamping member is configured to apply a clamping force on the wear indication device in a radial direction.

The embodiments and benefits of the brake pad according to the first aspect are likewise preferred embodiments and benefits of the vehicle brake according to the second aspect and vice versa. For purposes of clarity and discussion, further reference is thus made to the description of the brake pad provided above.

Preferably, the brake pad has a cut-out surrounding the recess such that the recess is arranged within the region of the cut-out. Thus, the recess is readily accessible while at the same time, the wear indication device is arranged proximate to the brake lining, wherein the arrangement allows the wear indication device to come into contact with the disc brake just when a predefined thickness of the friction lining is reached that is below the height of the projection from the recess, e.g. the head portion or any other projection of the wear indication device extending beyond the recess.

The invention has herein above been described in a first aspect will respect to a brake pad and in a second aspect with respect to a vehicle brake.

In a third aspect, the invention also relates to a method for assembling a vehicle brake, in particular a vehicle brake according to the second aspect, wherein the method comprises the steps: arranging a clamping member around a wear indication device, in particular around a shaft portion of a wear indication device, wherein the clamping member is preferably at least partly received in a circumferential groove of the wear indication device, arranging the wear indication device and the clamping member proximate to a recess of a brake pad carrier, and coupling the wear indication device and the brake pad carrier by a linear movement of the wear indication device and the clamping member toward the recess and along an axial direction of the recess, such that the wear indication device is at least partly received in the recess and the clamping member rests against an inner wall of the recess, thereby applying a clamping force on the wear indication device in a radial direction.

Preferred embodiments and benefits of the invention, according to the first and second aspect, are similarly preferred embodiments and benefits of the present invention according to the third aspect.

For a more complete understanding of the invention, the invention will be described in further detail with reference to the accompanying drawings. The detailed description will illustrate and describe what is considered as a preferred embodiment, in one aspect, of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further, the features described in the description, the drawings and the claims disclosing the invention may be essential for the invention considered alone or in combination. In particular any reference signs in the claims shall not be construed as limiting the scope of the invention. The wording "comprising" does not exclude other elements or steps. The wording "a" or "an" does not exclude a plurality.

These and other aspects, features and/or technical effects will be apparent from and elucidated with reference to the illustrations described hereinafter.

DETAILED DESCRIPTION OF THE DRAWINGS

Figure 1:
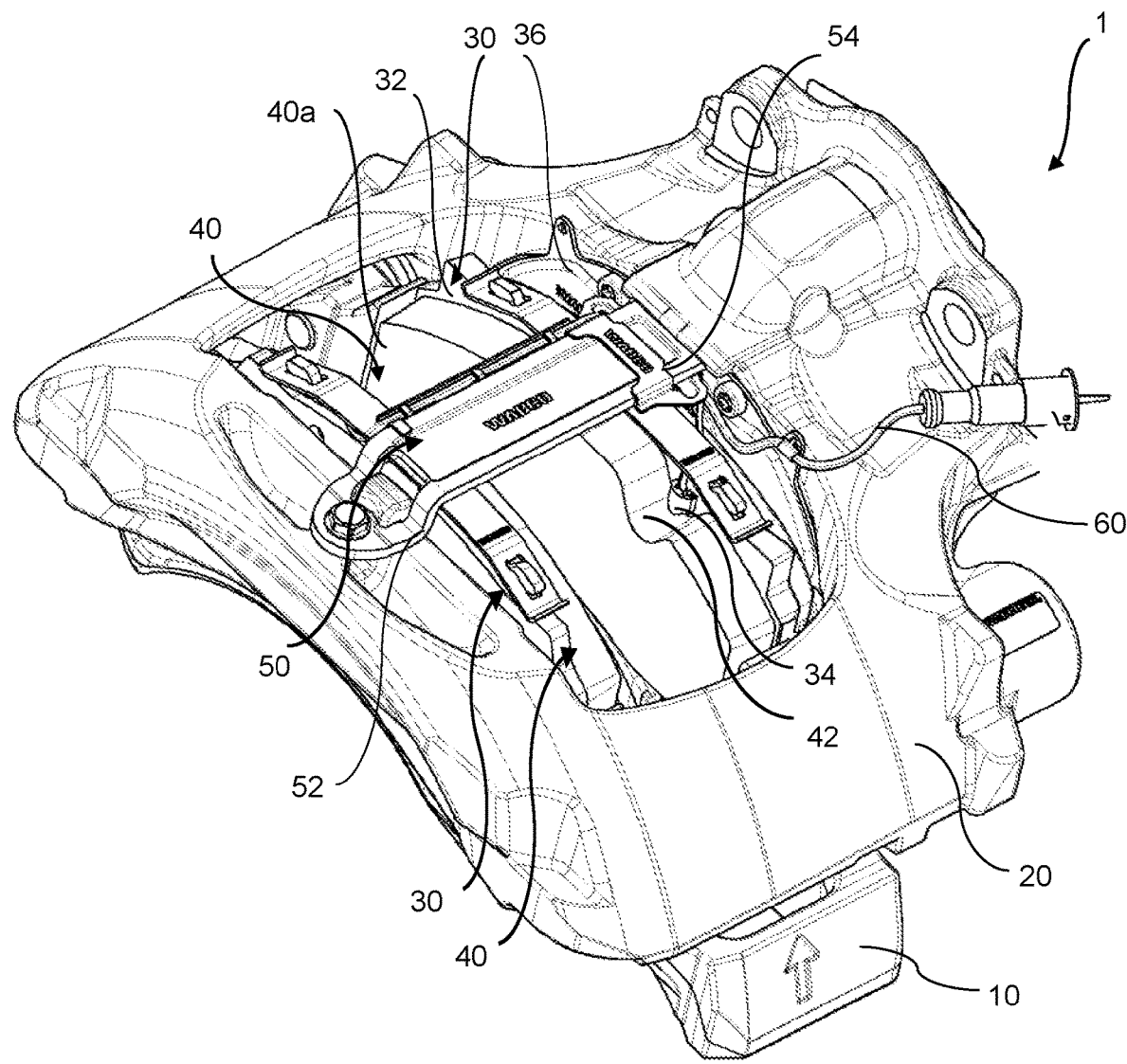
FIG. 1 is a perspective view of a disc brake according to an aspect of the disclosure.

FIG. 1 shows a disc brake 1 including a brake carrier 10, which is mountable to a corresponding receiving section of a vehicle. The disc brake 1 further includes a brake caliper 20, which forms an accommodation space for, among others, brake pads 40, each including a brake pad carrier 30, each having a friction lining 40a that comes into contact with the disc of the brake (not shown) during braking in order to apply a braking force.

The brake pad carrier 30 extends completely over the inner surface of the brake caliper 20 and projects beyond the upper periphery of the brake caliper 20. In the projecting region are provided one or more attachment counterparts.

Each of the brake pad carriers 30 has a support surface 32 configured to carry one of the friction linings 40a.

Further, the brake pad carrier 30 has a wear indication device 34 mounted to it that is configured to assess the degree of wear of the brake pads 40 and in particular of the friction lining 40a. The wear indication device 34 is coupled to the brake pad carrier 30 and at least partly received in a recess (see FIG. 2) of the brake pad carrier 30.

Each of the brake pads 40 has a cut-out 42 surrounding the recess (see FIG. 2) such that the recess is arranged within the region of the cut-out 42. Thus, the wear indication device 34 is surrounded by the brake pad 40 wherein the cut-out 42 allows an easy access to the wear indication device 34 without requiring demounting of the brake pads 40.

The two brake pad carriers 30 each carrying one of the brake pads 40 are held in position by a spring hanger 50.

The spring hanger 50 is preferably connected to the brake caliper 20 by a spring hanger seat 54 on one side and by a spring hanger fixation means 52 on the other side. After releasing the spring hanger fixation means 52 and guiding the spring hanger 50 out of its seat 54, the spring hanger 50 may be removed. When the spring hanger 50 is removed, the brake pads 40 may be removed likewise and may be exchanged.

The wear indication device 34 is coupled to a signal cable 60 having a connector on its distal end.

Figure 2:
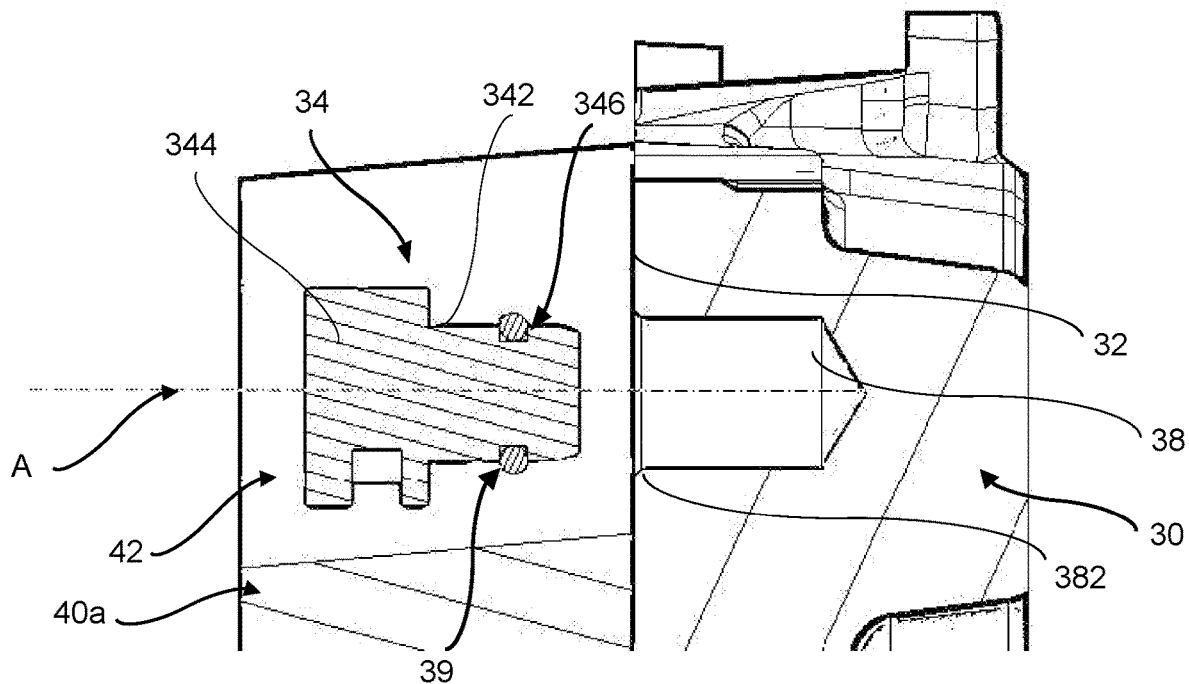
FIG. 2 is a sectional detail view of a brake pad of the disc brake of FIG. 1 according to an aspect of the disclosure.
Figure 3:
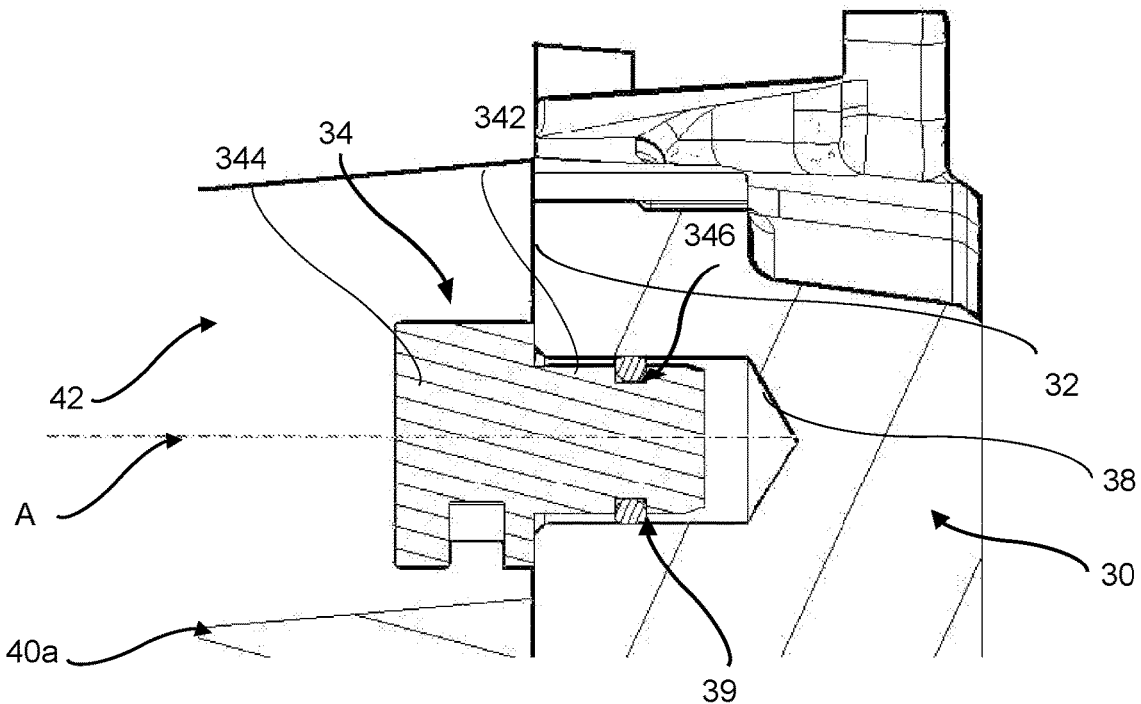
FIG. 3 is a sectional detail view of the brake pad according to FIG. 2 shown in another mounting state.

FIGS. 2 and 3 show the brake pad carrier 30 and the wear indication device 34 according to a first preferred embodiment in a sectional view.

In FIG. 2, the wear indication device 34 is positioned just before the recess 38 of the brake pad carrier 30. By a movement along an axial direction A of the recess 38, the wear indication device 34 comes into the position shown in FIG. 3, in which the wear indication device 34 is at least partly received in the recess 38.

The wear indication device 34 further has a head portion 344 which comes into contact with the support surface 32 when the shaft portion 342 is inserted into the recess 38 as shown in FIG. 3.

The brake pad carrier 30 further has the clamping member 39, which at least partly surrounds the shaft portion 342. The clamping member 39 is configured to rest against an inner surface of the recess 38 (see FIG. 3) and to apply a clamping force in radial direction on the wear indication device 34 in order to couple the wear indication device 34 with the recess 38 of the brake pad carrier 30.

The wear indication device 34 (see also FIG. 6) has a circumferential groove 346 at least partly receiving the clamping member 39. The clamping member 39 rests at least partly against an inner wall of the groove 346 such that the clamping member 39 can be positioned with respect to the length of the shaft portion 342 in a repeatable manner.

The clamping member 39 has a circular cross-sectional area and the circumferential groove, according to this preferred embodiment, has a rectangular cross-sectional area such that the clamping member 39 can perform evasive or compensating movements into the corners of the circumferential groove 346 when shear forces are acting on the clamping member 39 during insertion of the wear indication device 34 together with the clamping member 39 into the recess 38. There are also other cross-sectional areas defining the circumferential groove 346 within the scope of the invention having for example a polygonal cross-sectional area or a groove having the sharp inner corners as shown in FIG. 2, but radial tapered outer corners.

Preferably, the recess 38 has a radially inwards tapered entrance portion 382 (see FIG. 2) such that the insertion of the wear indication device 34 and in particular the clamping member 39 is guided by said tapered entrance portion 382.

Figure 4:
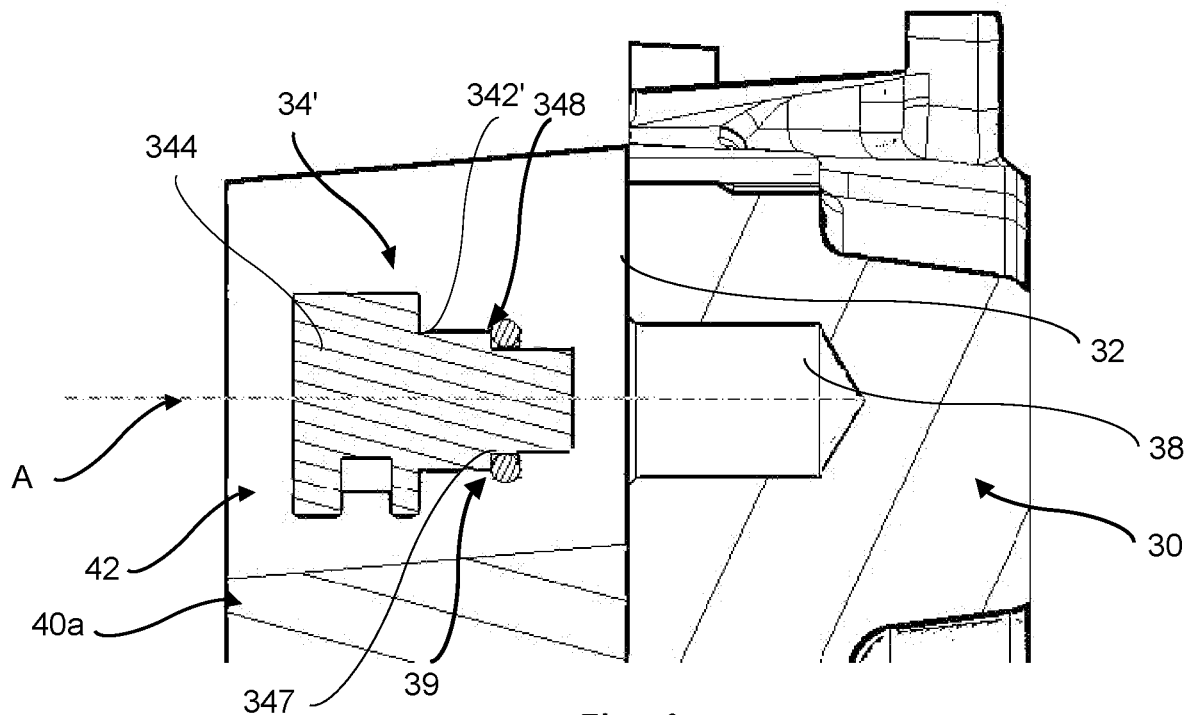
FIG. 4 is a sectional detail view of a brake pad of the disc brake of FIG. 1 according to another aspect of the disclosure.
Figure 5:
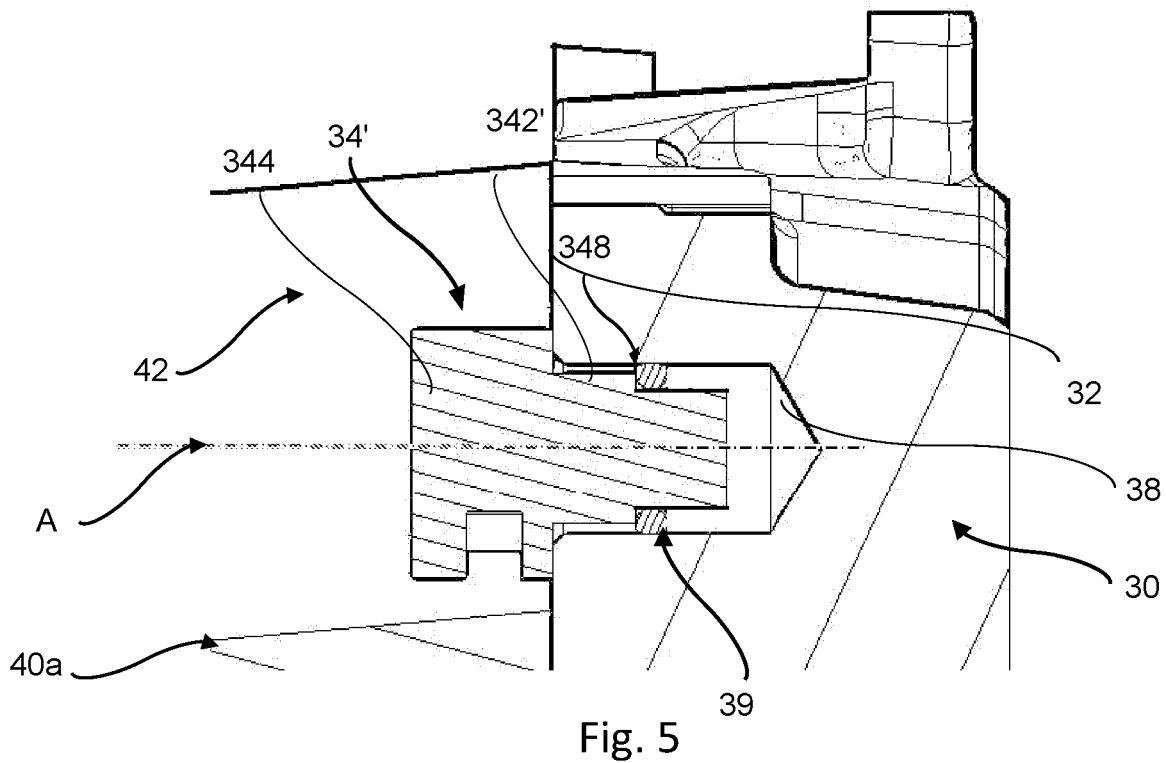
FIG. 5 is a sectional detail view of the brake pad according to FIG. 4 in another mounting state.

With reference to FIGS. 4 and 5, another preferred embodiment differs from the first preferred embodiment, shown in FIGS. 2 and 3, in that the shaft portion 342' has a stop shoulder 348 instead of a groove, wherein the clamping member 39 rests against the stop shoulder 348. By having such a stop shoulder 348, the clamping member 39 is also positioned with respect to the length of the shaft portion 342' in a repeatable manner. The stop shoulder 348 forms a circumferential corner 347 (see FIG. 4) with the distal end of the shaft portion 342', wherein the clamping member 39 can move into said corner 347 when shear forces are acting on the clamping member 39 during insertion of the wear indication device 34' together with the clamping member 39 into the recess 38.

In order to perform evasive or compensating movements as described above, the clamping member 39 is elastically deformable in such a way that the clamping member 39 can deflect upon shear forces acting on the clamping member 39 when being inserted into the recess 38 together with the wear indication device 34, 34'.

Figure 6:
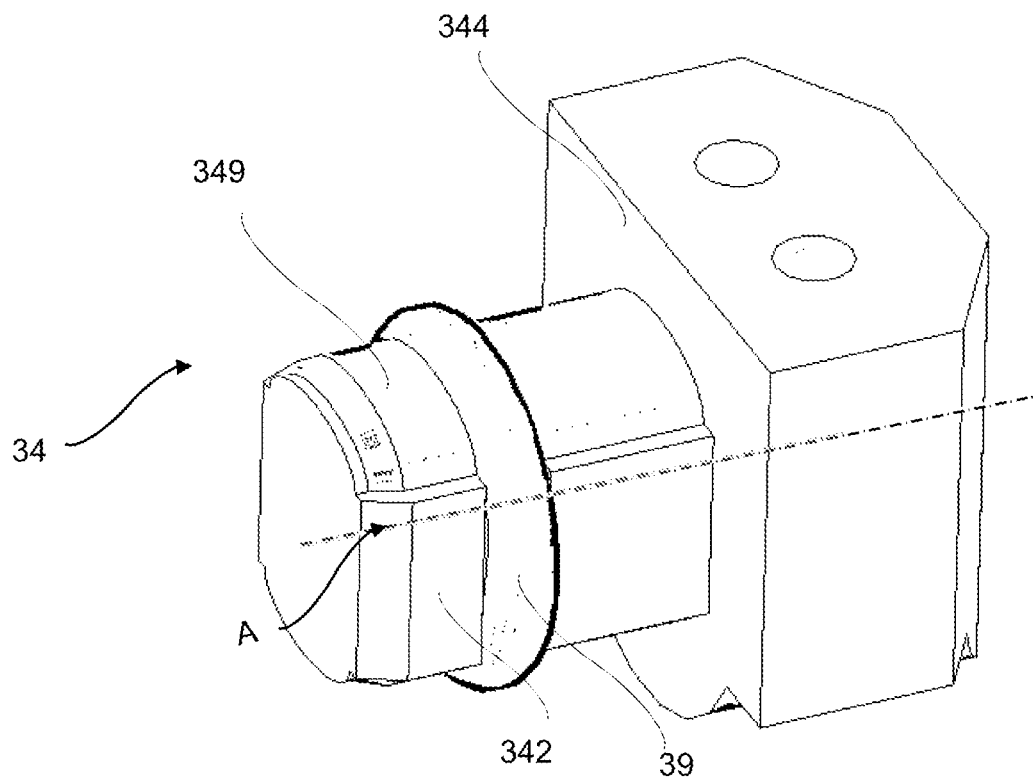
FIG. 6 is a perspective view of a wear indication device and a clamping member of the brake pad according to FIGS. 2 and 3.

As best shown in FIG. 6, the wear indication device 34 has a part-cylindrical or cylindrical shaft portion 342 extending in axial direction A.

It will be understood that the term "part-cylindrical or partially cylindrical" comprises designs in which the shaft portion has at least a part being cylindrical along the axial direction wherein adjacent parts can have other cross-sectional areas as for example a polygonal form. The term also implies other preferred embodiments, as for example a shaft portion extending in the axial direction A and having a circular cross-sectional area, wherein at least one part-circular segment is removed, and wherein the part-circular segment is defined by a secant and the respective segment of the circumference of the cross-sectional area separated by the secant. Due to the removed cross-sections, the part of the outer surface forming a lateral surface 349 of the cylindrical part of the shaft portion 342 function as guiding surfaces when inserting the wear indication device 34 into the recess 38 (see FIG. 2).

Figure 7:
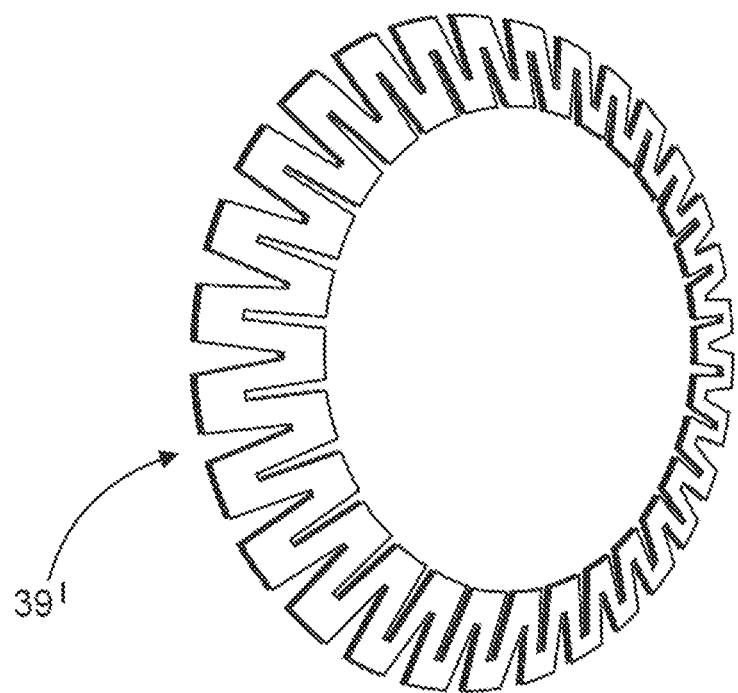
FIG. 7 is a perspective view of the clamping member according to an aspect of the disclosure.

Further designs of the clamping member 39 are within the scope of the invention as for example the embodiment shown in FIG. 7. It will be understood that any kind of clamping member described herein can rest against the stop shoulder 348 as shown in FIGS. 4 and 5 or being at least partly received in the groove 346 as shown in FIGS. 2 and 3. Such clamping members provide radial forces between the wear indication device 34 and the inner wall of the recess 38 to retain the wear indication device 34 therein, while also allowing insertion into the recess 38 and removal from the recess 38.

Anyway, a person skilled in the art will recognize some design measures that can be done in order to improve the positioning of the clamping member 39.

In the embodiments shown in FIGS. 2 to 6, the clamping member 39 comprises an elastomeric material that allows an elastic deformation upon the forces acting on the clamping member 39 when inserting the wear indication device 34 together with the clamping member 39 into the recess 38 (see FIGS. 2 to 4). Thus, in FIGS. 2 to 6, the clamping member 39 is in the form of an O-ring which is at least partly received in the groove 348 (see FIGS. 2 to 3) or rests against the stop shoulder 348 (see FIGS. 4 and 5).

FIG. 7 shows another preferred embodiment of the clamping member 39' in which the clamping member 39' is in the form of or consists of a star washer.

In an alternative embodiment (not shown), there can be a tolerance provided between the wear indication device 34 and the recess 38 such that a ring-shaped slotted clamping member can be arranged coaxially to the axial direction A such that the clamping member can perform evasive or compensating movements by moving the distal ends of the slotted ring-shaped clamping member towards each other within the groove 346 or along the stop shoulder 348.

It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further, the features described in the description, the drawings and the claims disclosing the invention may be essential for the invention considered alone or in combination. In particular any reference signs in the claims shall not be construed as limiting the scope of the invention. The wording "comprising" does not exclude other elements or steps. The wording "a" or "an" does not exclude a plurality.

What is claimed is:

1. A brake pad (40) of a vehicle brake (1), in particular of a disc brake of a commercial vehicle, the brake pad (40) comprising:
   a brake pad carrier (30) having a support surface (32),
   a friction lining (40a) attached to the support surface (32)
   a recess (38) extending from the support surface (32) in an axial direction, and
   a wear indication device (34) arranged at least partially inside the recess (38),
   wherein the brake pad carrier (30) includes a clamping member (39, 39') resting against an inner wall of the recess (38), wherein the clamping member (39, 39') applies a clamping force on the wear indication device (34) in a radial direction;
   wherein the clamping force applied in a radial direction provides a frictional clamping force, wherein the frictional clamping force permits an axial retraction of the wear indication device out of the recess when the frictional clamping force is overcome.

2. The brake pad (40) according to claim 1, wherein the wear indication device (34) includes a shaft portion (342, 342') received in the recess (38) and a head portion (344) resting against the support surface (32), wherein the shaft portion (342, 342') is configured to couple the wear indication device (34) to the brake pad carrier (30).

3. The brake pad (40) according to claim 2, wherein the shaft portion (342, 342') is at least part-cylindrical and the clamping member (39, 39') extends at least partially circumferentially around the shaft portion (342, 342').

4. The brake pad (40) according to claim 2, wherein the shaft portion (342) defines a circumferential groove (346) at least partly receiving the clamping member (39, 39').

5. The brake pad (40) according to claim 4, wherein the circumferential groove (346) has a first transverse extension in the axial direction and the clamping member (39, 39') has a second transverse extension in the axial direction, and wherein the first transverse extension is larger than the second transverse extension.

6. The brake pad (40) according to claim 4, wherein the groove (346) is defined by a base side and a first and second side both extending at an angle from the base side, wherein the clamping member (39, 39') is at least partly received between the first and the second side.

7. The brake pad (40) according to claim 2, wherein the shaft portion (342') has a stop shoulder (348) and the clamping member (39, 39') rests against the stop shoulder (348).

8. The brake pad (40) according to claim 2, wherein the clamping member (39, 39') engages a stop shoulder (348) or a groove (346) of the shaft portion (342, 342'), wherein the stop shoulder (348) or the groove (346) is arranged in the distal half of the shaft portion (342, 342').

9. The brake pad (40) according to claim 2, wherein the shaft portion (342, 342') has a length that is at least equal to the width or depth or diameter of the shaft portion (342).

10. The brake pad (40) according to claim 1, wherein the clamping member (39) comprises an elastomeric material.

11. The brake pad (40) according to claim 1, wherein the clamping member (39, 39') is an O-ring arranged around the shaft portion (342, 342') of the wear indication device (34, 34').

12. The brake pad according to claim 1, wherein the recess defines an inner diameter extending inwardly from the support surface, wherein the clamping member applies the clamping force in a compressed state when the wear indication device is fully received in the recess, wherein the clamping member has an outer diameter in the compressed state that corresponds to the inner diameter of the recess, such that the wear indication device is axially removable while the clamping force is being applied.

13. A brake pad (40) of a vehicle brake (1), in particular of a disc brake of a commercial vehicle, the brake pad (40) comprising:
   a brake pad carrier (30) having a support surface (32),
   a friction lining (40a) attached to the support surface (32)
   a recess (38) extending from the support surface (32) in an axial direction, and
   a wear indication device (34) arranged at least partially inside the recess (38),
   wherein the brake pad carrier (30) includes a clamping member (39, 39') resting against an inner wall of the recess (38), wherein the clamping member (39, 39') applies a clamping force on the wear indication device (34) in a radial direction;
   wherein the clamping member (39, 39') comprises a spring;
   wherein the clamping member (39') is a star washer arranged around the shaft portion (342) of the wear indication device (34, 34') or the clamping member (39') is a slotted ring, in the form of an undulated spring band material, arranged around the shaft portion (342, 342') of the wear indication device (34, 34').

14. A vehicle brake (1), in particular disc brake of a commercial vehicle, the vehicle brake (1) comprising:
   a brake disc,
   a brake pad (40) having a friction lining (40a), wherein the friction lining (40a) is configured to bear against the brake disc during braking, and a brake pad carrier (30) configured to carry the friction lining (40a) proximate to the brake disc, the brake pad carrier (30) comprising:
   a support surface (32) for carrying the brake pad (40),
   a recess (38) extending into the support surface (32) in an axial direction (A), and
   a wear indication device (34, 34') arranged at least partially inside the recess (38),
   wherein the brake pad carrier (30) includes a clamping member (39, 39') resting against an inner wall of the recess (38), wherein the clamping member (39, 39') applies a clamping force on the wear indication device (34) in a radial direction;
   wherein the clamping force applied in a radial direction provides a frictional clamping force, wherein the frictional clamping force permits an axial retraction of the wear indication device out of the recess when the frictional clamping force is overcome.

15. A vehicle brake (1) according to claim 14, wherein the brake pad (40) includes a cut-out (42) defining a region thereof, wherein the cut-out surrounds the recess (38), such that the recess (38) is arranged within the region of the cut-out (42).

16. The vehicle brake (1) of claim 15, wherein the wear indication device (34) projects axially from the support surface (32) into the region of the cut-out (42), and the wear indication device (34) axially overlaps the friction lining (40*a*).

17. The vehicle brake (1) of claim 14, wherein the clamping member (39, 39') engages a stop shoulder (348) or a groove (346) of the wear indication device (34, 34'), wherein the stop shoulder (348) or groove (346) axially retains the clamping member (39, 39') relative to the wear indication device (34, 34').

18. A method for assembling a vehicle brake (1), in particular a disc brake of a commercial vehicle, the method comprising the steps of:
arranging a clamping member (39, 39') around a wear indication device (34, 34'), wherein the wear indication device includes a shaft portion (342, 342') thereof, wherein the clamping member is arranged around the shaft portion (342, 342') of the wear indication device (34, 34'), wherein the clamping member (39, 39') is at least partly received in a circumferential groove (346) of the wear indication device (34, 34'), arranging the wear indication device (34, 34') and the clamping member (39, 39') adjacent a recess (38) of a brake pad carrier (30), and coupling the wear indication device (34, 34') and the brake pad carrier (30) by a linear movement of the wear indication device (34, 34') and the clamping member (39, 39') towards the recess (38) and along an axial direction (A) of the recess (38), such that the wear indication device (34, 34') is at least partly received in the recess (38) and the clamping member (39, 39') rests against an inner wall of the recess (38) thereby applying a clamping force on the wear indication device (34, 34') in a radial direction wherein the clamping force applied in a radial direction provides a frictional clamping force; and retracting the wear indication device out of the recess by overcoming the frictional clamping force in response to a pulling force applied on the wear indication device.

19. The method of claim 18, wherein the clamping member (39, 39') engages a stop shoulder (348) or a groove (346) of the shaft portion (342, 342') (34, 34'), wherein the stop shoulder (348) or groove (346) axially retains the clamping member (39, 39') relative to the wear indication device (34, 34').

\* \* \* \* \*